Sept. 4, 1956     C. A. SHERMAN     2,761,477
SAW GUARD
Filed March 29, 1955
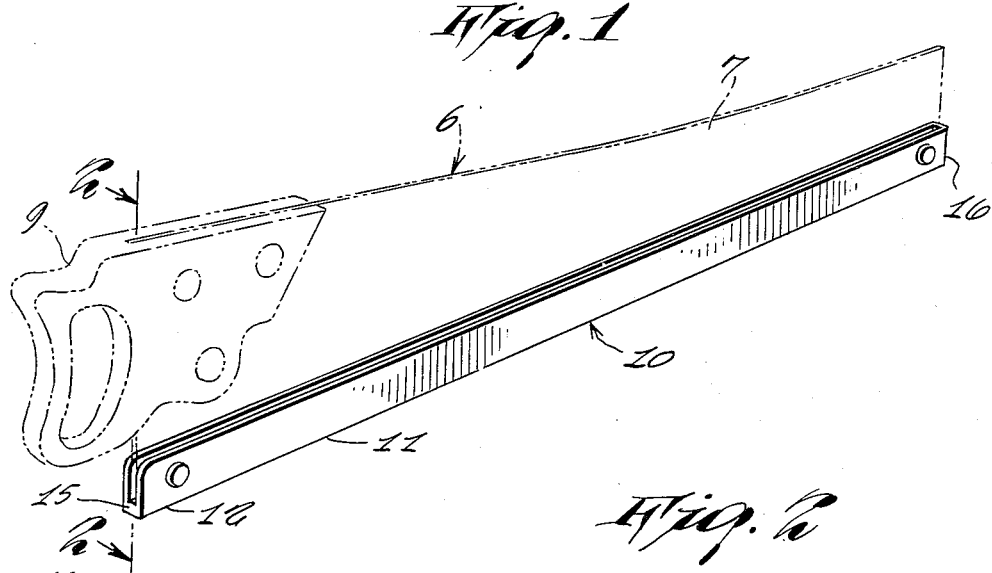
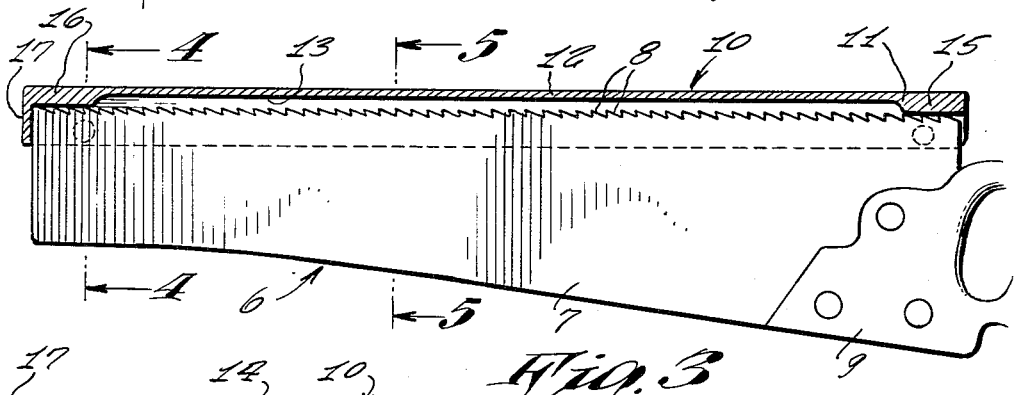
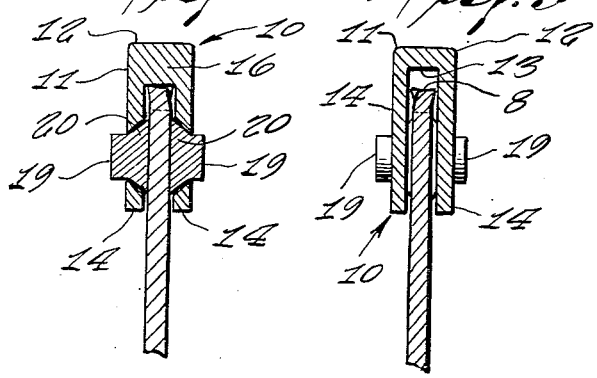
INVENTOR.
Clarence A. Sherman United States Patent Office 2,761,477
Patented Sept. 4, 1956

2,761,477

SAW GUARD

Clarence A. Sherman, Portland, Oreg.

Application March 29, 1955, Serial No. 497,599

5 Claims. (Cl. 145—35)

The present invention relates to protectors and guards for carpenter's tools and the like, and particularly to a special guard for a carpenter's saw.

The main object of my invention is to provide protective or covering means for a straight saw that will fully protect the teeth thereof when the saw is out of action or idle.

Another object of the invention is to have a special guard for a straight saw that will fit along the toothed edge thereof and not only serves to protect the teeth of the saw but also provides a reinforcement for the saw for storage.

An ancillary object is to have such a saw guard provided with means that will tend to retain the guard in place upon the saw blade and prevent the guard from dropping off.

A further object is to have a plurality of magnets mounted on the guard in effective positions to engage or abut the surface of the saw blade and tend to cling to the same to retain it in place.

It is even an object to have the magnets so shaped and so placed that they are not likely to drop out of the saw guard but instead will be held in effective position for receiving the saw blade between them.

It is, of course an object, withal to have such a special saw guard that is reasonable in cost, easy to make and use and entirely practical in use in order to encourage wide distribution on the market.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a perspective view of a straight carpenter's saw with a saw guard applied thereto which is made according to the invention and embodies the same in a practical form;

Figure 2 is a longitudinal section of the same as taken on line 2—2 in Figure 1;

Figure 3 is an elevation of the saw guard alone as seen from the upper edge thereof in the position of Figure 1;

Figure 4 is a transverse section as taken on line 4—4 in Figure 2; and

Figure 5 is another transverse section as taken on line 5—5 in the same Figure 2.

Throughout the views, the same reference numerals indicate the same or like parts and features.

Everyone who is familiar with wood working tools, and especially with cross cut and rip saws knows that the teeth should always be sharp and free from damage in order to cut accurately. All too often, saws are allowed to strike various hard objects and to have teeth damaged in various ways, simply because these teeth were not protected in any way. Of course, make shift bags or protectors have been tried, but nothing effective has been generally adopted, and thus a need still remains.

Upon considering this problem, it has occurred to me that a special saw guard like an open sheath could well be designed, with additional features that would facilitate putting it on and taking it off a saw, and also remaining on the saw as long as desired. As a result, I have succeeded in producing a very effective saw guard along the lines already mentioned, as will now be described in detail in the following.

Hence, in the practice of my invention, and referring also again to the drawing, a straight saw, generally indicated at 6 has the saw blade 7 provided with a row of cutting teeth 8, 8 thereon of more or less conventional character, the handle 9 serving to hold the saw in use.

For the purpose of protecting the saw, a saw guard, generally indicated at 10 is used, primarily includes an elongated slotted sheath member 11 of substantially U-shaped cross section and made of light metal such as aluminum alloy, plastic of the vinyl or acetate series or even styrene type plastic or of any other suitable material for the purpose. At both ends, the bottom 12 is thicker than the intermediate longer portion 13 wherein the slot between side walls 14, 14 is deeper than at the ends 15, 16 in order to bring the bottom out of contact with the saw teeth 8 when the saw 6 is fitted into the guard. Only the few teeth at both ends of the saw are thus in actual contact with the guard bottom, and as the material of the guard (plastic) is softer than the steel of the saw blade, there is no likelihood of damage to the saw teeth occurring at any time. At the one end 16 is provided with an end closure or end wall 17 to abut the far end 18 of the saw blade 7 and determine a proper place for the saw in the guard.

Thus far described, the guard could possibly fall off the saw if the side walls 14, 14 are not a snug fit, which do not require it to be. Instead, it is an important feature of my invention to embed a plurality of opposed permanent magnets 19, 19 in the side walls 14, 14 of the guard, being substantially cylindrical at their outer exposed ends, but internally being expanded to frustoconical form at 20, 20 where these magnets directly face the saw blade 7 and locate this blade between them, as best seen in Figure 4. These magnets tend to cling to the side surfaces of the blade and exert sufficient pull on this blade to retain it in place until the saw is deliberately pulled out of the guard by hand. The guard thus tends to remain in place upon the saw blade covering its teeth, especially as the guard is light in construction and material, and a tolerably close fit upon the saw when the magnets are considered. Mere pulling off by hand will remove the saw blade from the guard when the saw is to be used, while insertion of the saw into the guard is the work of a moment when the saw is no longer to be used. Whether the magnets are Alnico or of steel, the principle is the same.

Manifestly, variations may be resorted to, and parts and features may be modified or used without others within the scope of the appended claims.

Having now fully described my invention, I claim:

1. A saw guard for a saw with a straight saw blade and teeth along one edge thereof, said saw guard including an elongated sheath member of lightweight rigid material having an open slot along one edge and being substantially of U-shaped cross section including a bottom wall joining two parallel side walls, an end wall upon the sheath member closing the slot at that one end while the other end is open to allow insertion of the saw, and means for preventing the major portion of the row of teeth on the saw blade from making direct contact with the interior bottom wall of the open slot in said sheath member.

2. A saw guard according to claim 1, wherein the last mentioned means includes a thickened bottom at each end of the open slot in the sheath member, the latter having the longer intermediate portion of the open slot made deeper than at both ends thereof.

3. A saw guard according to claim 2, wherein a plurality of permanent magnets are fixed in the side walls of the sheath member or guard for magnetically retaining the saw blade and guard in releasable association allowing manual release of the saw from the guard at will and also reinsertion of the saw into the guard.

4. A saw guard according to claim 3, wherein the magnets are embedded in the side walls of the sheath member or guard in opposed pairs, and wherein each magnet has an inwardly flaring frusto-conical portion directly facing the side surfaces of the saw blade.

5. A saw guard according to claim 4, wherein each magnet is formed with an outer cylindrical portion partly projecting out through the side walls of the sheath member or guard.

References Cited in the file of this patent
FOREIGN PATENTS

| | | |
|---|---|---|
| 113,470 | Sweden | Mar. 13, 1945 |
| 776,867 | France | Nov. 17, 1934 |
| 971,708 | France | Aug. 9, 1950 |